V. G. APPLE.
LICENSE PLATE BRACKET FOR AUTOMOBILES.
APPLICATION FILED FEB. 14, 1918.
1,312,295.
Patented Aug. 5, 1919.
2 SHEETS—SHEET 2.
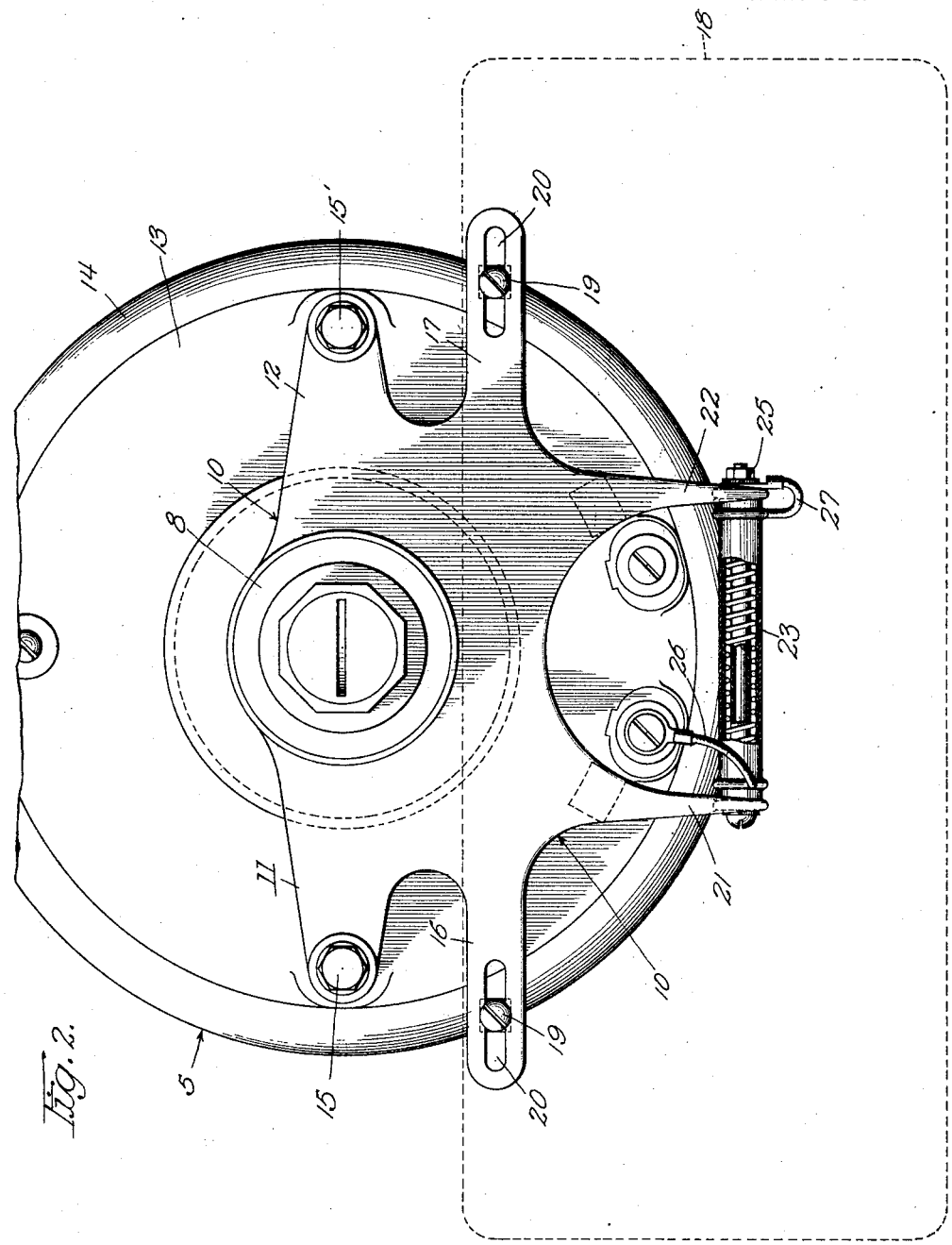

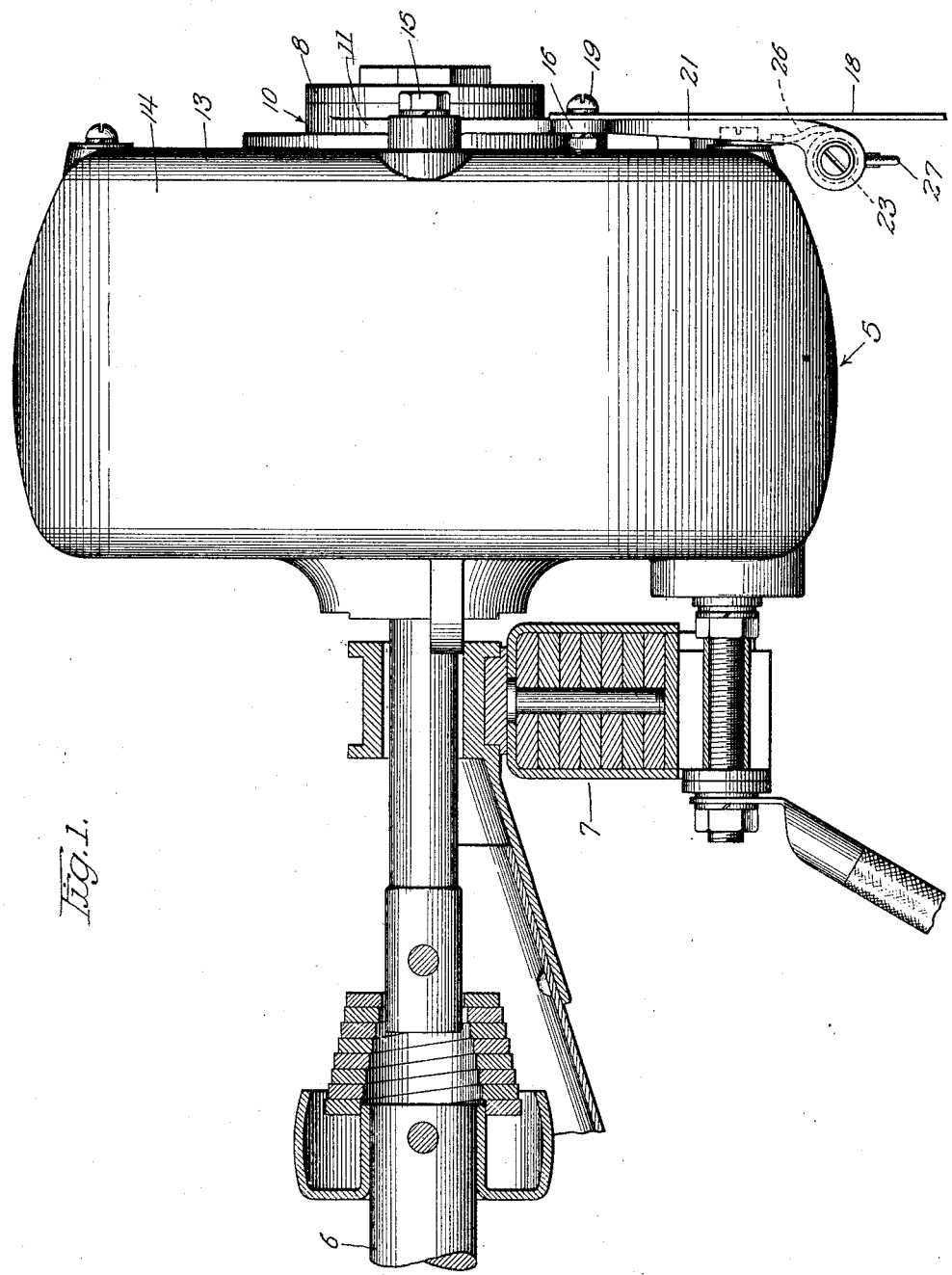

UNITED STATES PATENT OFFICE.

VINCENT G. APPLE, OF DAYTON, OHIO.

LICENSE-PLATE BRACKET FOR AUTOMOBILES.

1,312,295.     Specification of Letters Patent.     Patented Aug. 5, 1919.

Original application filed April 23, 1917, Serial No. 163,803. Divided and this application filed February 14, 1918. Serial No. 217,151.

*To all whom it may concern:*

Be it known that I, VINCENT G. APPLE, a citizen of the United States, residing at Dayton, in the county of Montgomery and State of Ohio, have invented certain new and useful Improvements in License-Plate Brackets for Automobiles, of which the following is a specification.

My invention relates to license plate bracket for automobiles.

One of the objects of my invention is to provide a new and improved means for attaching a license plate to the front end of automobiles.

Another object is to provide a bracket that is attachable to the front end of a dynamo electric machine adaptable for use on machines of this character that are supported, before the radiator, and connected to the engine shaft.

Other and further objects of my invention will become readily apparent to persons skilled in the art from a consideration of the following description when taken in conjunction with the drawings, wherein:—

Figure 1 is a side elevation of a dynamo mounted on an automobile.

Fig. 2 is an end view of the bracket showing its manner of attachment to the dynamo.

In both views the same reference characters indicate similar parts.

In the present embodiment, a dynamo electric machine is shown having its axis in alinement with the axis of the engine.

The particular dynamo is also provided with a separable, axially arranged, and self contained current governor or regulator. Such governors require to have associated therewith a non-inductive resistance, in exercising their desired function as governors.

I have utilized this bracket as a means, also, for carrying the resistance coil which, of necessity, is a concomitant part of the governor, and furthermore another feature of economy and utility is the means adopted for securing the bracket to the front end of the dynamo, which is accomplished by the two cap screws that hold the front plate to the field magnet frame of the dynamo.

This is a divisional application from my original application Serial No. 163,803, filed April 23rd, 1917.

The dynamo electric machine 5 is connected to the engine shaft 6 and is mounted on the front end 7 of the automobile.

The separable current governor 8 is axially disposed and in this particular embodiment serves as one means for securing the bracket in place.

The bracket 10 is provided with two laterally extending, perforate arms 11 and 12, in which the perforations register with perforations in the front plate 13 and the field frame 14 of the dynamo, so that the cap screws 15, 15' may hold the three pieces together.

The bracket is provided with two slotted arms 16 and 17, whereby the license plate 18 may be supported. The screws 19 may be moved in the slots 20 for variations in the spacing of the holes in the top edge of the license plate.

The bracket is furthermore provided with two more arms 21 and 22 which project downwardly from the lower edge of the bracket between which the resistance coil 23 is supported from a screw 24 that passes through the coil and the arms, to the end of which is applied a nut 25. A terminal wire 26, from the dynamo, is connected to the insulated end of the coil 24, the other end of the coil 23 is grounded, to the arm 22, by the wire terminal 27.

The front end of the dynamo is closed by the end plate 13 and this plate is, preferably, composed of insulating material, as more fully disclosed in the original application.

The means of securing the license plate in place is noiseless, not liable to become loose and rattle and adds considerable to the artistic appearance of the installation.

Having described my invention, what I claim is:—

1. In combination with a dynamo electric machine having an end hub, a license plate bracket having means for supporting a license plate and means of attachment for securing it to the end of said dynamo electric machine including a part extending around the hub.

2. In combination with a dynamo electric machine having an end hub, a license plate bracket having means for supporting a license plate and means of attachment for securing it to the end of said dynamo electric machine including a part extending around said hub and means for supporting a resistance coil, behind the license plate.

In testimony whereof I hereunto set my hand.

VINCENT G. APPLE.